United States Patent Office 3,840,575
Patented Oct. 8, 1974

3,840,575
BISMUTH SUBCOMPOUNDS AND THEIR METHODS OF PREPARATION
Robert H. MacClaren, Rochester, N.Y., assignor to Shirley Atkins MacClaren, Rochester, N.Y.
No Drawing. Filed Aug. 3, 1972, Ser. No. 277,498
Int. Cl. C07f 9/94
U.S. Cl. 260—447                 5 Claims

ABSTRACT OF THE DISCLOSURE

This invention provides the compound bismuth subsalicylyl acetate and methods for its preparation as well as methods for preparing bismuth subcompounds of medicaments in general which bismuth subcompounds can be administered orally or rectally to deliver the medicament to the intestine. A medicament having a reactive carboxyl group or alkali metal salt of a carboxyl group is reacted to replace the alkali metal ion or the reactive hydrogen ion of the carboxyl group with an oxybismuth group in a one-step or two-step procedure. In the one-step procedure, the medicament is reacted with either bismuth oxychloride or bismuth oxybromide. In the two-step procedure, the medicament is reacted with a mild chlorinating agent or brominating agent to form the chlorocarbonyl or bromocarbonyl derivative of the medicament which then is reacted with bismuth subhydroxide to form the bismuth subcompound of the medicament. Bismuth subsalicylyl acetate also is produced by reacting bismuth subsalicylic acid with acetic acid in an acidic medium.

---

This invention relates to novel bismuth subcompounds, their methods of preparation and their use by oral or rectal administration to humans.

Presently, there are a wide variety of medicaments that are ineffective when administered orally since they are dissociated by the stomach acids. When it is desired to deliver a medicament as for example aspirin, penicillin, ampicillin, cephalosporin or the like to the intestinal tract for example they must be administered parenterally. It would be highly desirable to provide a means which would permit oral or rectal administration of these medicaments without their being dissociated in the stomach.

The present invention provides novel bismuth subcompounds obtained from medicaments having a reactive carboxyl group which subcompounds are not dissociable in the stomach but are dissociable in the intestinal tract and therefore can be administered orally and/or rectally. These bismuth subcompounds are prepared by replacing the reactive hydrogen atom of the carboxyl group with an oxybismuth radical. In one process the acid form or the alkali metal salt of the medicament is reacted with a mild chlorinating or brominating agent in a first step to convert the carboxyl group to a chlorocarboxyl or bromocarboxyl radical. The resulting halogenated compound is then reacted with the bismuth subhydroxide to replace the chlorine or bromine atom with an oxybismuth radical. Alternatively, the medicament or alkali metal salt of the medicament can be reacted with bismuth oxychloride or bismuth oxybromide to replace the reactive hydrogen atom of the carboxyl group and the alkali metal with the oxybismuth radical.

It has been found that when known medicaments having a reactive carboxyl group is converted to the corresponding bismuth subcompound, the resultant product can be administered orally for direct transmission to the intestinal tract without being decomposed in the stomach. One unexpected and surprising result which has been observed when orally administering these bismuth subcompounds in that the individual receiving the compound is not affected with cold symptoms over long periods while administration is continued or if the individual already has cold or influenza (la grippe) symptoms prior to receiving the bismuth subcompounds, the symptoms clear up relatively quickly.

Suitable medicaments that can be modified in accordance with this invention include acetyl salicylic acid, penicillin, ampicillin, cephalosporin and the like.

In accordance with this invention, the bismuth subcompounds can be prepared by a process wherein the carboxyl group of the medicament is converted to a chloro or bromo carbonyl group by reacting the medicament with a mildly acidic chlorinating or brominating agent while maintained at a pH between about 2.5 and 7.0. Thereafter the chloro or bromo carbonyl compound is reacted with bismuth subhydroxide to form the corresponding bismuth subcompound of the medicament. Suitable chlorinating or brominating agents include thionyl bromide, thionyl chloride, organic hypochlorites, such as t-butylhypo-chlorite, or the like. The reaction is carried out in an inert non-polar suspension medium such as benzene or toluene at a temperature between about 20° C. and about 70° C. for a period of time up to about 8 hours. The reactants are added in stoichiometric amounts or the chlorinating or brominating agent can be added in excess. The halogenated product is recovered from the non-polar suspension medium, preferably by filtration. The halogenated medicament then is reacted with bismuth subhydroxide in a non-polar suspension medium at a temperature below about 70° C. for a period of time up to about 8 hours. The resultant bismuth subcompound is obtained from the suspension medium preferably by filtration and thereafter can be washed and dried.

The reactions are represented by the following equations in which the medicament is acetyl salicylic acid or its alkali metal salt.

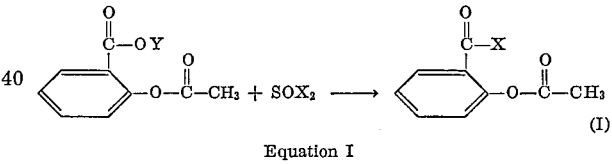

Equation I

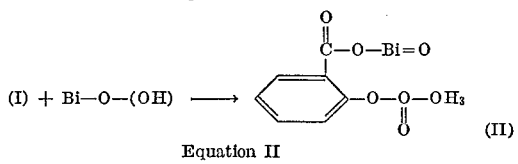

Equation II wherein Y is hydrogen or an alkali metal and X is bromine or chlorine.

An alternative method comprises reacting the medicament and its alkali metal salt with bismuth oxychloride or bismuth oxybromide at a temperature below about 70° C. in a non-polar suspension medium for periods up to about 8 hours. The reactants can be added in a stoichiometic amounts or the bismuth oxychloride or bismuth oxybromide can be added in excess. The bismuth subcompound of the medicament is recovered from the medium for example by filtration, washed and dried.

The reaction is represented by the following equation wherein the medicament is acetyl salicylic acid and its alkali metal salt.

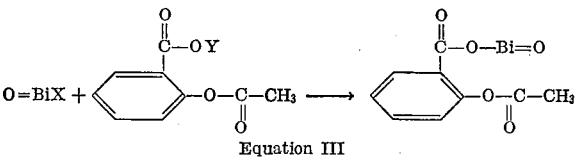

Equation III wherein X and Y are defined above.

When it is desired to form bismuth subsalicylyl acetate, a third alternative procedure can be employed wherein bismuth subsalicylic acid is reacted with acetic acid in the presence of a second acid and in a suspension medium that prevents ester interchange such as acetoacetic acid. Reaction is conducted at room temperature up to about 35° C. and at a pH between 1.5 and 6.0. The product is recovered from the suspension medium by filtration, and then can be washed with a non-polar solvent, and then washed with water and dried. Suitable acids include sulfuric acid, trichloroacetic, or the like.

Compounds of this invention can be used to form unit dosage forms that can be administered orally or rectally. The amount of a particular compound in the unit dosage may be greater than the amount presently employed in administering these compounds parenterally. Thus, 100 to 500 milligrams of bismuth subsalicylyl acetate can be employed in a unit dosage form. The unit dosage form can be prepared by admixing the bismuth subcompound with a suitable binder and tableting the resulting composition.

The following examples are intended to illustrate the present invention and are not intended to limit the same.

EXAMPLE I

Bismuth sub hydroxide was formed by reacting 51.9 grams of bismuth sub carbonate with 80 grams of ammonium hydroxide. The reaction was conducted in an aqueous medium at 60° C. for about 6 hours. The bismuth sub hydroxide was recovered by filtration and washing with distilled water.

A suspension of acetyl salicylic acid was prepared by mixing 18.0 grams of the powdered acid in benzene until a homogeneous suspension of the acid was formed. Thereafter, the suspension was heated to a temperature of about 60° C. and thionyl chloride was added dropwise into the suspension for about 6 hours. The reaction product, was recovered from the reaction medium by filtration, washed and then dried to recover 20.0 grams of the 2 acetoxy benzoyl chloride. The 2-acetoxy benzoyl chloride then was suspended in benzene and thereafter 24.2 grams of bismuth sub hydroxide was added thereto. The suspension was heated to a temperature of about 45 to 60° C. for about 8 hours to form bismuth sub acetyl salicylic acid with evolution of hydorgen chloride. After about 12 hours the reaction medium was filtered to recover 31.0 grams of bismuth sub acetyl salicylic acid which was washed in distilled water, benzene and then distilled water again and then dried. 31.0 grams of bismuth sub acetyl salicylic acid was recovered.

EXAMPLE II

A suspension of 18.0 grams of acetyl salicylic acid in benzene was formed and heated to a temperature of about 35 to 50° C. Thereafter bismuth oxichloride was added to the suspension and stirred for about 4 to 6 hours while maintaining the temperature at 50° C. The product, bismuth sub acetyl salicylic acid was recovered by filtration, washed with distilled water and then dried. 35 grams of the bismuth sub acetyl salicylic acid was recovered by this process.

EXAMPLE III

A suspension was formed by adding 34.5 grams of bismuth sub salicylic acid to acetoacetic acid, and which was heated to about 30 to 35° C. Thereafter 6.6 grams of acetic acid and 2.0 grams of sulfuric acid was added to the suspension to reduce the pH of the suspension to about 1.4. The suspension was agitated and maintained at this temperature for about 12 hours and the product, bismuth sub acetyl salicylic acid was recovered by filtration, washed with benzene, washed with distilled water and dried. 32.5 grams of the product bismuth sub acetyl salicylic acid was recovered by this process.

What is claimed is:

1. Bismuth subsalicylyl acetate.
2. The process for forming bismuth subsalicylyl acetate which comprises reacting a compound of the formula:

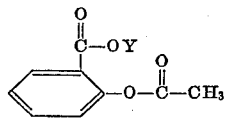

wherein Y is hydrogen or alkali metal with a mild chlorinating or brominating agent to convert the carboxyl group to a chlorocarbonyl or bromocarbonyl substituent reacting the chlorocarbonyl or bromocarbonyl compound with bismuth subhydroxide to form bismuth subsalicylyl acetate and isolating the bismuth subsalicylyl acetate.

3. The process of claim 2 wherein Y is hydrogen.
4. The process for forming bismuth subsalicylyl acetate which comprises reacting a compound of the formula:

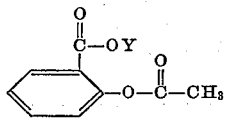

wherein Y is hydrogen or alkali metal with bismuth oxychloride or bismuth oxybromide to form bismuth subsalicylyl acetate and isolating the bismuth subsalicylyl acetate.

5. The process of claim 4 wherein Y is hydrogen.

References Cited

UNITED STATES PATENTS

| | | | |
|---|---|---|---|
| 1,522,054 | 1/1925 | Hahl et al. | 260—447 |
| 809,583 | 1/1906 | Seifert | 260—447 |
| 1,998,750 | 4/1935 | Bruson et al. | 260—447 X |
| 2,061,320 | 11/1936 | Hampe et al. | 260—447 X |
| 2,090,201 | 8/1937 | Herrmann et al. | 260—447 X |
| 2,101,867 | 12/1937 | Miller et al. | 260—447 X |
| 2,110,472 | 3/1938 | Raiziss et al. | 260—447 X |
| 3,239,411 | 3/1966 | Leebrick | 260—447 X |

DANIEL E. WYMAN, Primary Examiner

P. F. SHAVER, Assistant Examiner

U.S. Cl. X.R.

424—296, 230

UNITED STATES PATENT OFFICE
CERTIFICATE OF CORRECTION

Patent No. 3,840,575          Dated October 8, 1974

Inventor(s) Robert H. MacClaren

It is certified that error appears in the above-identified patent and that said Letters Patent are hereby corrected as shown below:

In Column 2, change the Equation II from:

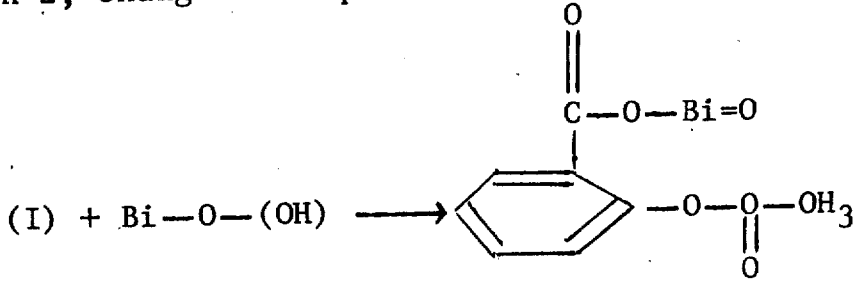

to the following:

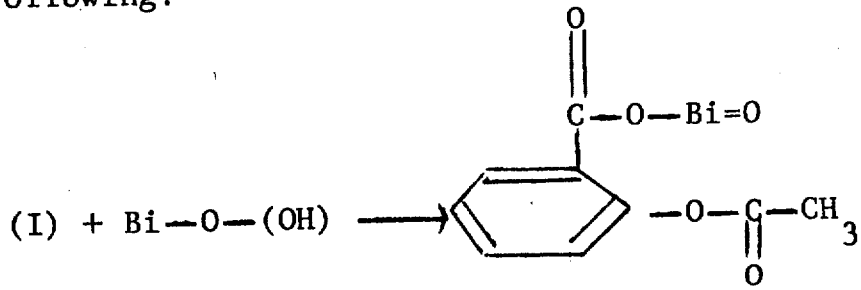

Signed and sealed this 14th day of January 1975.

(SEAL)
Attest:

McCOY M. GIBSON JR.          C. MARSHALL DANN
Attesting Officer            Commissioner of Patents